(12) United States Patent
Wu et al.

(10) Patent No.: US 11,968,380 B2
(45) Date of Patent: Apr. 23, 2024

(54) ENCODING AND DECODING VIDEO

(71) Applicant: INTEL CORPORATION, Santa Clara, CA (US)

(72) Inventors: Jiaping Wu, Pudong (CN); Kin-Hang Cheung, San Jose, CA (US); Bo Zhao, Pudong (CN)

(73) Assignee: INTEL CORPORATION, Santa Clara, CA (US)

( * ) Notice: Subject to any disclaimer, the term of this patent is extended or adjusted under 35 U.S.C. 154(b) by 892 days.

(21) Appl. No.: 16/305,462

(22) PCT Filed: Jun. 29, 2016

(86) PCT No.: PCT/CN2016/087584
§ 371 (c)(1),
(2) Date: Nov. 29, 2018

(87) PCT Pub. No.: WO2018/000224
PCT Pub. Date: Jan. 4, 2018

(65) Prior Publication Data
US 2020/0329250 A1  Oct. 15, 2020

(51) Int. Cl.
*H04N 19/40* (2014.01)
*H04N 19/51* (2014.01)

(52) U.S. Cl.
CPC ............. *H04N 19/40* (2014.11); *H04N 19/51* (2014.11)

(58) Field of Classification Search
CPC .... H04N 21/23; H04N 21/4402; H04N 19/40; H04N 19/51; H04N 19/436; H04L 29/08;
(Continued)

(56) References Cited

U.S. PATENT DOCUMENTS 5,982,459 A * 11/1999 Fandrianto ............. H04N 7/142
348/425.3
9,332,308 B2 * 5/2016 Nakagawa ....... H04N 21/43622
(Continued)

FOREIGN PATENT DOCUMENTS

CN 103581665 A 2/2014
CN 105228000 A 1/2016
(Continued)

OTHER PUBLICATIONS

NPL Google search; 2020. (Year: 2020).*
(Continued)

*Primary Examiner* — Luis Perez-Fuentes
(74) *Attorney, Agent, or Firm* — Hanley, Flight & Zimmerman, LLC

(57) ABSTRACT

An apparatus for encoding and decoding video receives a request to decode a current video frame. The apparatus determines whether encoding is within a threshold for a previous video frame. Additionally, the apparatus waits for the encoding to start if the encoding is within the threshold. Further, the apparatus provides a signal to begin encoding the current video frame. Also, the apparatus submits a decode workload to a graphics processor unit (GPU) for the current video frame. The apparatus additionally submits, in parallel with submitting the decode workload to the GPU, an encode workload to the GPU for the previous video frame.

20 Claims, 9 Drawing Sheets

(58) Field of Classification Search
CPC . H04L 29/0854; H04L 67/10; H04L 67/1095; G09G 5/006; G09G 2370/16
See application file for complete search history.

(56) References Cited

U.S. PATENT DOCUMENTS

| | | | | |
|---|---|---|---|---|
| 10,298,931 | B2* | 5/2019 | Ibrahim | H04N 19/197 |
| 2007/0030905 | A1 | 2/2007 | Cote | |
| 2013/0202028 | A1 | 8/2013 | Jun et al. | |
| 2014/0037005 | A1* | 2/2014 | Lee | H04N 19/53 |
| | | | | 375/240.16 |
| 2014/0321554 | A1 | 10/2014 | Cheung et al. | |
| 2015/0036735 | A1* | 2/2015 | Smadi | H04L 65/605 |
| | | | | 375/240.02 |
| 2015/0179130 | A1* | 6/2015 | Smadi | H04N 19/70 |
| | | | | 345/520 |
| 2016/0085439 | A1* | 3/2016 | Threlkeld | G06F 3/0486 |
| | | | | 715/740 |
| 2016/0203579 | A1* | 7/2016 | Griffin | G09G 5/006 |
| | | | | 345/520 |

FOREIGN PATENT DOCUMENTS

| | | |
|---|---|---|
| CN | 1052280000 | 1/2016 |
| WO | 2008031039 A2 | 3/2008 |
| WO | 2016093978 A1 | 6/2016 |
| WO | 2017050116 A1 | 3/2017 |

OTHER PUBLICATIONS

Energy efficient multicast screen mirroring for QoS support over WiFi; Yumin; Nov. 2016 (Year: 2016).*
Energy Efficient WiFi Display; Zhang; 2015 (Year: 2015).*
Microsoft Computer Dictionary, 336 (5th ed. 2002).*
Wi-Fi display technical specification, version 1.0.0.—2012. (Year: 2012).*
Energy efficient multicast screen mirroring for QoS support over WiFi; Yumin; 2016. (Year: 2016).*
Supplementary European Search Report for Related European Application Serial No. EP 16 90 6626 with a completion date of Dec. 16, 2019, 2 pages.
Langer, Klaus Technologie der Intel Core-Prozessoren Sandy- und Ivy-Bridge : Architektur der Intel-CPU erklart—PC Magazin XP055652862 Jan. 24, 2013 (retrieved from the internet: URL: https://www.pc-magazin.de/ratgeber/intel-sandy-bridge-technik-erklaert-1464554.html) 11 pages.
International Search Report for Related PCT Application PCT/CN2016/087584, filed Jun. 29, 2016 mail date Mar. 8, 2017, 3 pages.
European Patent Office, "Communication Pursuant to Article 94(3) EPC," mailed in connection with European Patent Application No. 16906626.3, on Mar. 17, 2021, 5 pages.
European Patent Office, "Summons to attend oral proceedings pursuant to Rule 115(1) EPC," mailed in connection with European Patent Application No. 16906626.3, on Jan. 17, 2024, 9 pages.

* cited by examiner

| Adaptive Scheduler for Decode and Encode | Default | Adaptive |
|---|---|---|
| Concurrency (%) | 1.504 | 30.697 |
| GPU Utilization (%) | 30.444 | 23.784 |
| GPU Power(mW) | 208 | 198 |

FIG. 7

ENCODING AND DECODING VIDEO

CROSS REFERENCE TO RELATED APPLICATIONS

Pursuant to 35 U.S.C. § 371, this application is the United States National Stage Application of International Patent Application No. PCT/USCN2016/087584, filed Jun. 29, 2016, the contents of which are incorporated by reference as if set forth in their entirety herein.

BACKGROUND

Encoding is a technique for converting data, such as video data, into a more compact format for efficient transmission or storage. Decoding is the opposite of encoding, i.e., converting the encoded data back into the original format. Encoding and decoding video data is useful for enabling a mobile computing device (mobile device) to play video, whether the video is streaming to the device, or locally stored. In the case of streaming video, encoding enables the efficient transmission to the mobile device. Additionally, decoding makes it possible for the mobile device to play, or otherwise process, the video. However, encoding and decoding of video data is resource-intensive in terms of processor, memory, and battery use. These resource-intensive techniques are a drain on the typically limited resources of mobile devices.

BRIEF DESCRIPTION OF THE DRAWINGS

FIG. 7 is a table showing benefits of adaptively scheduling encoding and decoding video.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

In the following description, numerous specific details are set forth, such as examples of specific types of processors and system configurations, specific hardware structures, specific architectural and micro architectural details, specific register configurations, specific instruction types, specific system components, specific measurements or heights, specific processor pipeline stages and operation, etc., in order to provide a thorough understanding of the present invention. It will be apparent, however, to one skilled in the art that these specific details need not be employed to practice the present invention. In other instances, well known components or methods, such as specific and alternative processor architectures, specific logic circuits or code for described algorithms, specific firmware code, specific interconnect operation, specific logic configurations, specific manufacturing techniques and materials, specific compiler implementations, specific expression of algorithms in code, specific power down and gating techniques or logic and other specific operational details of computer system have not been described in detail in order to avoid unnecessarily obscuring the present invention.

In some cases, a mobile device may be used for screen mirroring. Screen mirroring is a technique for taking an image, or multimedia, such as video, that is being presented on a mobile device, and presenting the image, or video, on another device, such as a television. The following discussion makes reference to performing screen mirroring using video, which is typically a combination of moving images and sound. However, in embodiments of the claimed subject matter, screen mirroring may be performed for static or moving images without sound.

Figure 1:
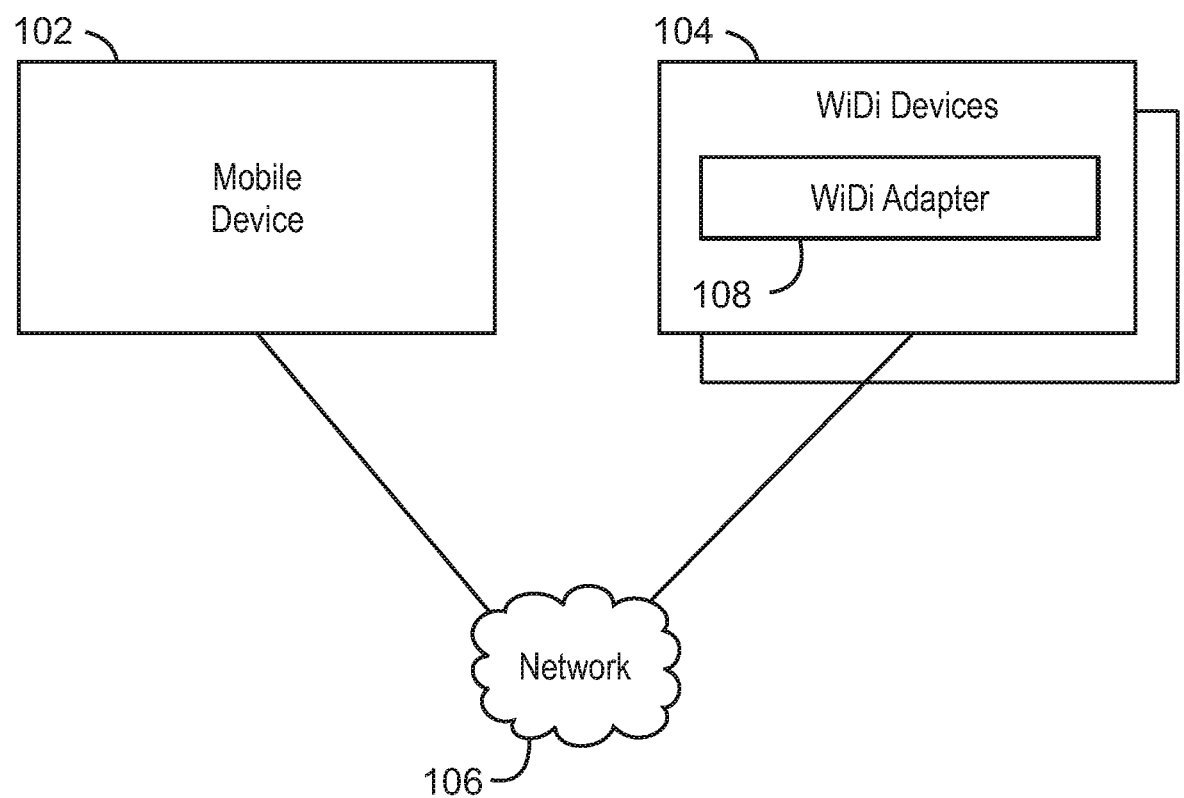
FIG. 1 is a block diagram of an example system for screen mirroring.

FIG. 1 is a block diagram of an example system 100 for screen mirroring. The system 100 includes a mobile device 102 and one or more wireless display (WiDi) devices 104, in communication over a network 106. The mobile device 102 may be a small form computing device, such as, a tablet computer, mobile phone, smart phone, phablet, or wearable device, and the like. The WiDi device 104 is an electronic device with a display, such as a television, a stand-alone monitor with speakers, a computer monitor with speakers, or any suitable display and speaker device that is connected, or otherwise coupled, with a WiDi adapter 108. The WiDi adapter 108 enables the WiDi device 104 to receive video from the mobile device 102 via a wireless network, and present the received video on the display of the WiDi device 104. Although FIG. 1 shows the WiDi adapter 108 as internal to the WiDi device 104, in one embodiment, the WiDi adapter 108 is external to the WiDi device 104. The network 106 may be any network or collection of networks for electronic communication. The network 106 is one or more computer communication networks, such as the Internet, a telephony network, a cellular network, a local area network, a wide area network, a personal area network, and the like. The network 106 includes one or more wireless networks for communication between the mobile device 102 and the WiDi adapter 108. Although one network is illustrated, the mobile device 102 may connect to a plurality of networks simultaneously.

In embodiments of the claimed subject matter, the mobile device 102 accesses video images for screen mirroring. The video images may be accessed from the network 106, or local storage (not shown). In one embodiment of the claimed subject matter, video accessed from the network 106 may be streaming video that is transmitted to the mobile device 102. In embodiments, streaming video may be video that is obtained from a network and rendered as it is received from the network. As discussed previously, video is encoded for efficient transmission and storage. As such, the video that arrives at the mobile device 102 is in an encoded format. Specifically, each frame of the video is encoded. Accordingly, the mobile device 102 decodes each frame of the encoded video so that the decoded video may be played using a media player that is local to the mobile device 102. Media players are software or hardware used to present images, sound, and video on computing devices, such as the mobile device 102. The video is additionally transmitted to the WiDi adapter 108 for presentation on the display of at least one WiDi device 104. More specifically, the video is transmitted to the WiDi adapter 108, which provides the video to the WiDi device 104. To enable efficient transmission of the video to the WiDi adapter 108, the mobile device 102, re-encodes the decoded video. The WiDi adapter 108 then decodes each frame of the received video, and provides the decoded video for presentation on the WiDi device 104.

In one embodiment of the claimed subject matter, the mobile device 102 accesses streaming video from a streaming video service (not shown) via the Internet. Once received at the mobile device 102, the streaming video is decoded, to a format that is compatible with the media player software, such as NV12. The NV12 format represents the decoded video as a Y plane, and a UV plane of interleaved U, V chroma values. The NV12 format is merely one example of a decoded format that is compatible with media players, although other formats may be used. To prepare for transmission to the WiDi adapter 108, the NV12 formatted video is re-encoded to a format, such as advanced video coding (AVC). The AVC format is an encoded format that is used for generic audio-visual services. The AVC-encoded video is transmitted over a wireless network, such as a personal area network, to the WiDi adapter 108. In turn, the WiDi adapter 108 decodes the AVC-encoded video, and provides the decoded video to the WiDi device 104 for presentation.

One issue in current systems with encoding and decoding video on the mobile device 102, is that there is no coordination of the encoding and decoding processes. As a result, encoding and decoding take place serially. However, serial processes occur one after the other, as in a series. By contrast, parallel processing, which is available on mobile devices, provides time and energy savings by enabling multiple processes to be performed concurrently. However, current systems cannot achieve these savings in serial processes.

Instead of serial execution, embodiments described herein adaptively schedule encoding and decoding. Adaptive scheduling means adapting mobile devices 102 to perform some of the encoding and decoding in parallel. Adaptive scheduling provides improved concurrency, reduced processor use, and thus, time and energy savings.

Figure 2:
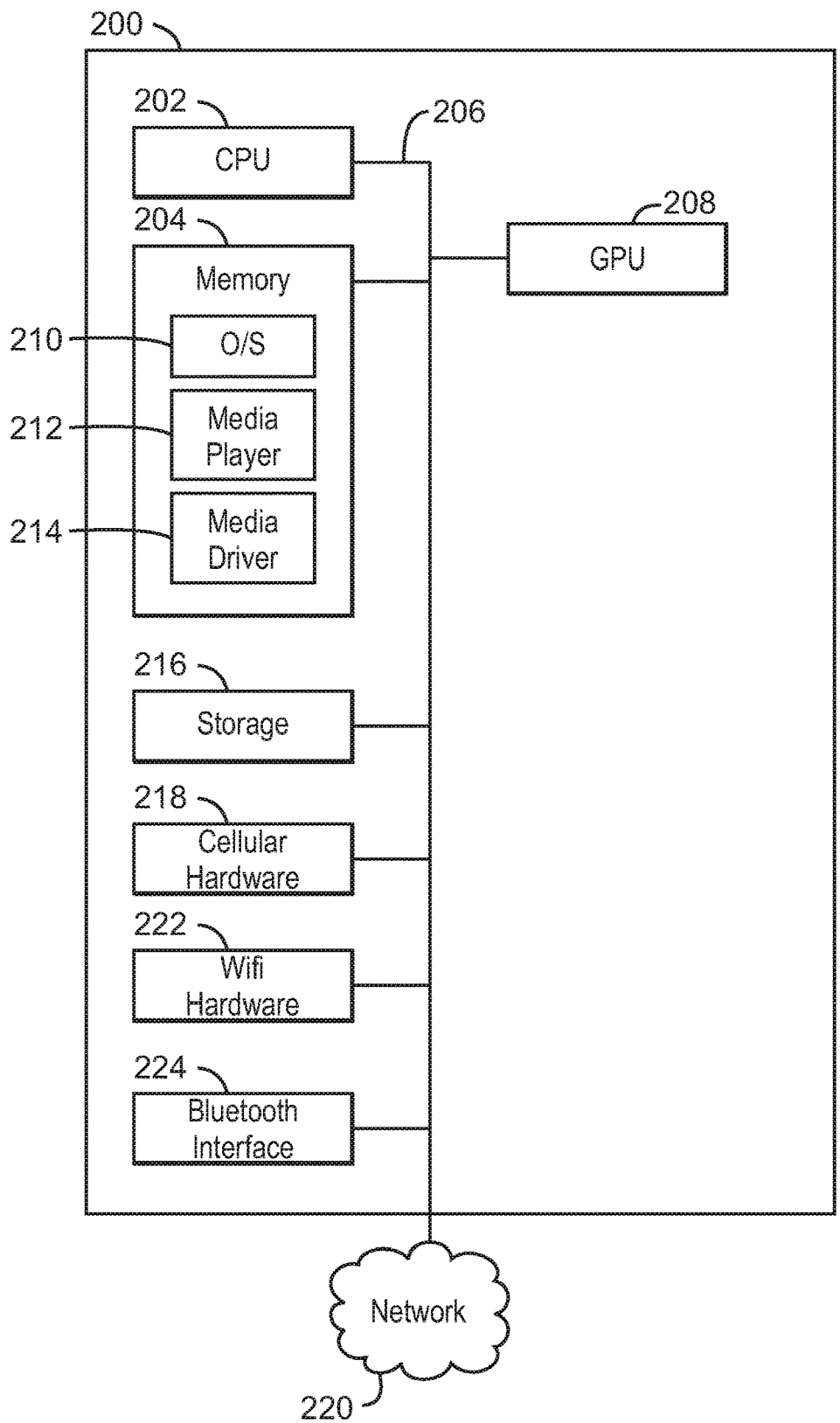
FIG. 2 is a block diagram of a computing device for encoding and decoding video.

FIG. 2 is a block diagram of an example mobile device 200 for encoding and decoding video. The mobile device 200 includes a central processing unit (CPU) 202 that executes stored instructions, as well as a memory 204 that stores instructions executable by the CPU 202. The CPU 202 can be a single core processor, a multi-core processor, or any number of other configurations. Furthermore, the mobile device 200 may include more than one CPU 202. The CPU 202 is coupled to the memory 204 by a bus 206. Additionally, the mobile device 200 includes a graphics processing unit (GPU) 208, connected to the bus 206. The GPU 208 is a computer processor for performing graphics operations, such as motion estimation, macroblock encoding, packetization, decoding, and the like. Motion estimation is the prediction about the color values of different pixels in an image based on color values in previous frames of a video. Macroblock encoding makes macroblock level code decision, outputs macroblock type, intra-mode, motion-vectors, distortions. Packetization involves residual calculation, transform, quantization, entropy encoding and frame reconstruction as reference of next frame. The GPU 208 is additionally coupled to the memory 204 by the bus 206.

The memory 204 may be one of random access memory (RAM), read only memory (ROM), flash memory, or any other suitable memory systems. For example, the memory 204 may include dynamic RAM (DRAM). The memory 204 includes an operating system 210, media player 212 and a media driver 214. The operating system 210 is software that serves as an interface between the computer programs run on the mobile device 200 and the hardware resources of the mobile device 200. Additionally, the operating system manages resources for computer hardware and software, and provides common services to computer programs. Typically, computer programs cannot function without an operating system. The media player 212 is software that enables the mobile device 200 to play multimedia files, e.g., files for movies, games, and so on. Although not shown in FIG. 2, the operating system 210 usually includes the media player 212. The media player 212 decodes and encodes streaming video by making calls to the media driver 214 through the operating system 210. The media driver 214 makes calls to the GPU 208 to perform the actual encoding and decoding.

The CPU 202 may be linked through the bus 206 to storage device 216. The storage device 216 is a physical memory, such as a hard drive, an optical drive, a flash drive, an array of drives, or any combinations thereof. The storage device 216 can store user data, such as audio files, video files, audio/video files, and picture files, among others. The storage device 216 can also store programming code such as device drivers, software applications, operating systems, and the like. The programming code stored to the storage device 216 may be executed by the CPU 202, GPU 208, or any other processors that may be included in the mobile device 200.

The CPU 202 may additionally be linked through the bus 206 to cellular interface 218. The cellular interface 218 may be any cellular technology, for example, the 4G standard (International Mobile Telecommunications-Advanced (IMT-Advanced) Standard promulgated by the International Telecommunications Union-Radio communication Sector (ITU-R)). In this manner, the mobile device 200 may access any network 220 without being tethered or paired to another device. The network 220 is an electronic communication network, such as network 106, described with respect to FIG. 1.

The CPU 202 may also be linked through the bus 206 to WiFi hardware 222. The WiFi hardware 222 is hardware according to WiFi standards (standards promulgated as Institute of Electrical and Electronics Engineers' (IEEE) 802.11 standards). The WiFi hardware 222 enables the mobile device 200 to connect to the network 220 using the Transmission Control Protocol and the Internet Protocol (TCP/IP), where the network 220 includes the Internet. Accordingly, the mobile device 200 can enable end-to-end connectivity with the Internet by addressing, routing, transmitting, and receiving data according to the TCP/IP protocol without the use of another device. Additionally, a Bluetooth Interface 224 may be coupled to the CPU 202 through the bus 206. The Bluetooth Interface 224 is an interface according to Bluetooth networks (based on the Bluetooth standard promulgated by the Bluetooth Special Interest Group). The Bluetooth interface 224 enables the mobile device 200 to be paired with other Bluetooth enabled devices through a personal area network (PAN). Accordingly, the network 220 may include a PAN. Examples of Bluetooth enabled devices include a laptop computer, desktop computer, ultrabook, tablet computer, mobile device, or server, among others.

The block diagram of FIG. 2 is not intended to indicate that the mobile device 200 is to include all of the components shown in FIG. 2. Rather, the mobile device 200 can include fewer or additional components not illustrated in FIG. 2 (e.g., sensors, power management integrated circuits, additional network interfaces, etc.). The mobile device 200 may include any number of additional components not shown in FIG. 2, depending on the details of the specific implementation. Furthermore, any of the functionalities of the CPU 202 and GPU 208 may be partially, or entirely, implemented in hardware, or in a processor. For example, the functionality may be implemented with an application specific integrated circuit, in logic implemented in a processor, or in logic implemented in a specific type of processing unit or in any other device.

To present streaming video on the WiDi device 104, as described above, the media player 212 begins execution. The media player 212 may provide an interface enabling selection of the video bitstream for playing. Additionally, the media player 212 may provide an interface for selecting the WiDi device 104 on which the video is presented. In some embodiments of the claimed subject matter, such an interface may allow the selection of multiple WiDi devices 104. In order to play the encoded, streaming video on the WiDi device 104, the video bitstream is decoded the compressed format in which the video is sent over the network 106. Decoding is accomplished by a call from the media player 212 to the media driver 214, requesting execution of the GPU 208 to decode the video. More specifically, the media driver 214 calls the operating system 210, which places the call to the GPU 208 to decode each frame of video. The decoded video frame is then encoded for transmission to the WiDi adapter 108. Similar to decoding, encoding is accomplished by a call from the media player 212 to the media driver 214, requesting execution of the GPU 208 to encode the video. Accordingly, the media driver 214 calls the operating system 210, which places the call to the GPU 208 to encode the video. The encoded video is then transmitted wirelessly to the WiDi adapter 108.

The processes of encoding and decoding the video may be accomplished using a processing pipeline. A processing pipeline is a series of data processes where, the output of one process is input to the next process in the series. Advantageously, the processes of a pipeline may be performed in parallel.

Figure 3:
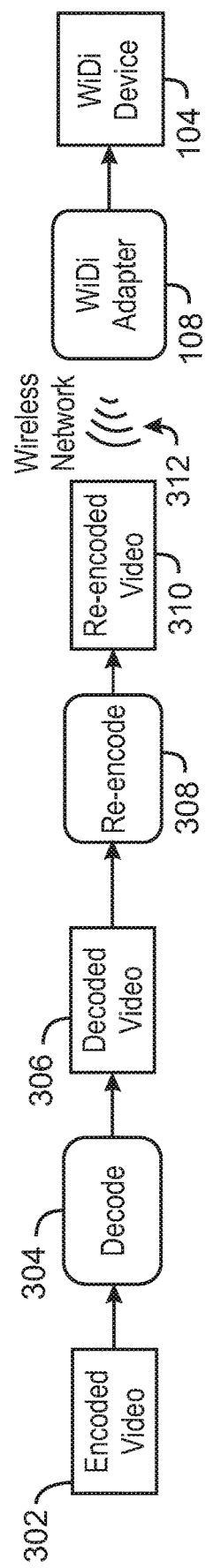
FIG. 3 is a block diagram of a wireless display (WiDi) video playback pipeline.

FIG. 3 is a block diagram of an example WiDi video playback pipeline 300. The WiDi video playback pipeline 300 represents the decoding and encoding processes performed by the mobile device 102. Additionally, the decoding and encoding processes may be performed in parallel in the pipeline 300. In the pipeline 300, each frame of encoded video 302 is input to a decode process 304. The encoded video 302 may be encoded in one of various formats, such as MPEG-4, H.264, HEVC, and the like. The decode process 304, decodes the encoded video frame, and outputs a frame of decoded video 306. The decoded video 306 is a frame of video decoded into a format, such as NV12.

In an embodiment of the claimed subject matter, the mobile device 102 may present the decoded video 306 on the mobile device 102. Additionally, or alternatively, the decoded video 306 is input to a re-encode process 308, which encodes the frame of decoded video 306 into a frame of re-encoded video 310. The re-encoded video 310 is re-encoded to a protocol, such as AVC. The re-encoded video 310 is then transmitted over a wireless network 312 to the WiDi adapter 108. As also described above, the WiDi adapter 108 decodes the frame of re-encoded video 310, which is provided to the WiDi device 104 for presentation. For example, the WiDi adapter 108 may provide video in formats, such as, high definition multimedia interface (HDMI), video graphics array (VGA), or the like.

As described above with respect to the network 106, the wireless network 312 may be a local area network, a personal area network, or the like. In one embodiment of the claimed subject matter, the WiDi adapter 108 may use Miracast technology. With Miracast technology, the mobile device 102 and the WiDi adapter 108 create a peer-to-peer network that enables the mobile device 102 and the WiDi adapter 108 to communicate directly, instead of through a wireless router. Typical home theatre systems have individual devices, e.g. smart televisions, game consoles, mobile devices, that communicate with each other through a wireless router. By contrast, the devices of the peer-to-peer network communicate directly. In one embodiment, the peer-to-peer network is WiFi Direct.

In embodiments of the claimed subject matter, the decoding and re-encoding of the pipeline 300 are performed in parallel. In such embodiments, the re-encode process 308 re-encodes a frame of decoded video 306, frame n, concurrently while the decode process 304 decodes the subsequent frame of encoded video 302, frame n+1. The re-encoding and decoding performed in the pipeline 300, are specifically performed by the GPU 208. In fact, the GPU 208 includes separate components that are individually configured to perform the decoding and re-encoding.

Figure 4:
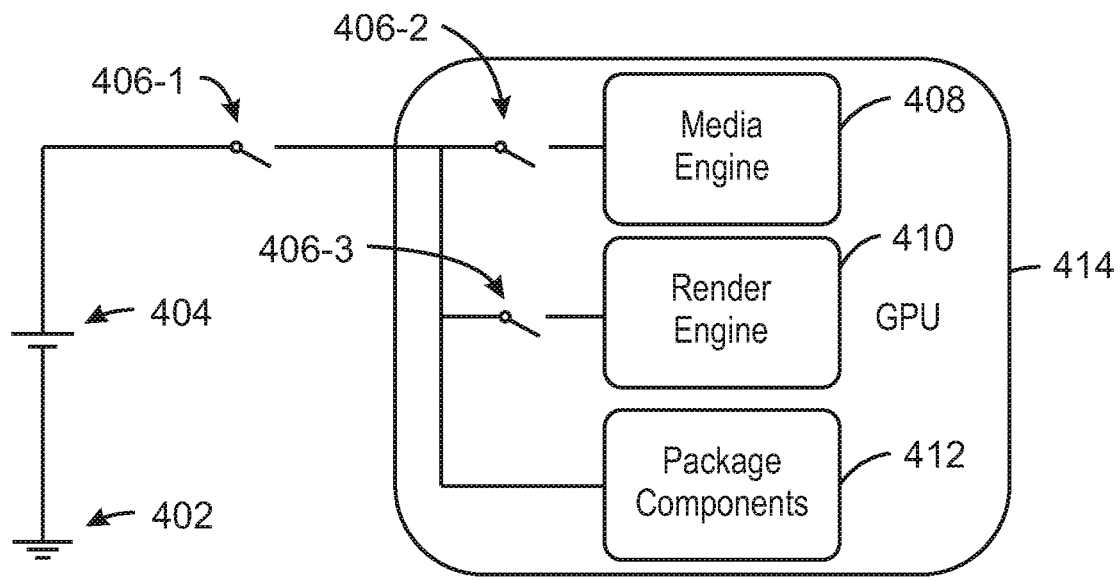
FIG. 4 is a block diagram of a graphics processing unit power supply schematic.

FIG. 4 is a schematic diagram of a GPU 414 and a power supply 402 for the GPU 414. The GPU 414 performs decoding and encoding when power from the power supply 402 is provided to one or more of the GPU components: media engine 408, render engine 410, and package components 412. Specifically, the power supply 402 provides a voltage source 404, for the GPU 414 to power the operation of the components of the GPU 414. Power is provided to the GPU 414 at the action of gate 406-1. The action of gate 406-1 powers the package components 412. Similarly, the action of gates 406-2, 406-3 powers the media engine 408 and render engine 410, respectively. The media engine 408 decodes encoded video 302. Decoding by the media engine 408 involves the subtasks of encotropy decoding, inverse quantization, inverse transform and motion compensation, to construct an output frame. The render engine 410 co-works with media engine to encode, or re-encode, decoded video 306 into re-encoded video 310. Encoding activity by the render engine 410 involves the subtasks of motion estimation (ME) and macroblock encoding (MBEnc). Encoding activity on media engine 408 involves motion vector and residual packetizing (PAK). As stated previously, embodiments of the claimed subject matter perform in parallel. More specifically, the media engine 408 decodes video frame n+1 concurrently with the render engine 410 re-encoding video frame n, which provides a savings in time and energy over current systems. In embodiments of the claimed subject matter, the action of gates 406-2, 406-3 may be invoked simultaneously to enable parallel processing of the media engine 408 and the render engine 410.

Figure 5A:
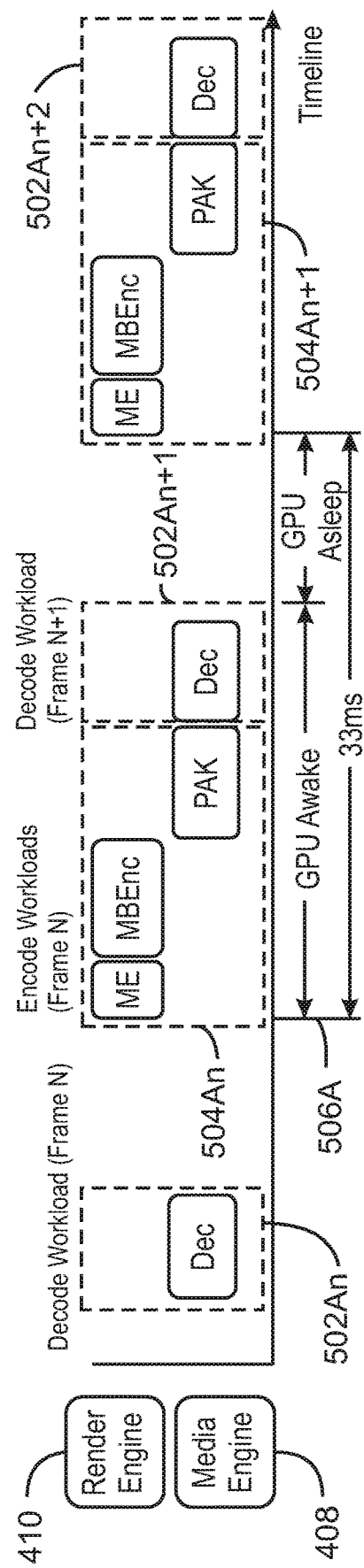
FIG. 5A is a timeline of encoding and decoding video in serial.

FIG. 5A is a timeline 500A of serial encoding and decoding of video frames by current systems. The timeline 500A shows the timing of the execution of the individual subtasks as performed by the media engine 408 and render engine 410. As stated previously, the render engine 410 performs motion estimation (ME) and motion block encoding (MBEnc). Additionally, the media engine 408 performs packing (PAK) and decoding (Dec). In current systems, there is no scheduler to coordinate the encoding and decoding of video bitstreams. Accordingly, the GPU 414 performs encoding and decoding workloads serially. As shown in the timeline 500A, media engine 408 performs a decode workload on frame n of the video, as illustrated at block 502An. A decode workload is the decoding subtask described above with respect to FIG. 4. Subsequently, the render engine 410 performs the motion estimation and motion block encoding on video frame n, as illustrated at block 504An. At the completion of motion block encoding, packaging may be performed. Hence, the packaging subtask is performed on video frame n, as also illustrated at block 504An. At the completion of the packaging subtask of video frame n, the media engine 408 performs the decode workload on frame n+1, as illustrated at block 502An+1. Blocks 504An+1 and 502An+2 show the subsequent encoding workload for frame n+1, and the decoding workload from frame n+2, respectively.

Timeframe 506A shows when the GPU is awake and asleep during an example GPU cycle of 33 ms. As shown, the encoding and decoding subtasks may performed within GPU processing cycles shown here as taking 33 milliseconds, for example. Because the encode and decode workloads are performed serially, much of the time that the GPU is awake, there is no activity going on in the media engine 408 and the render engine 410. In other words, there is no concurrency in the execution of the media engine 408 and the render engine 410. By contrast, embodiments of the claimed subject matter perform the decoding and encoding of two video frames concurrently, reducing the amount of time there is no activity therein while the GPU is awake.

Figure 5B:
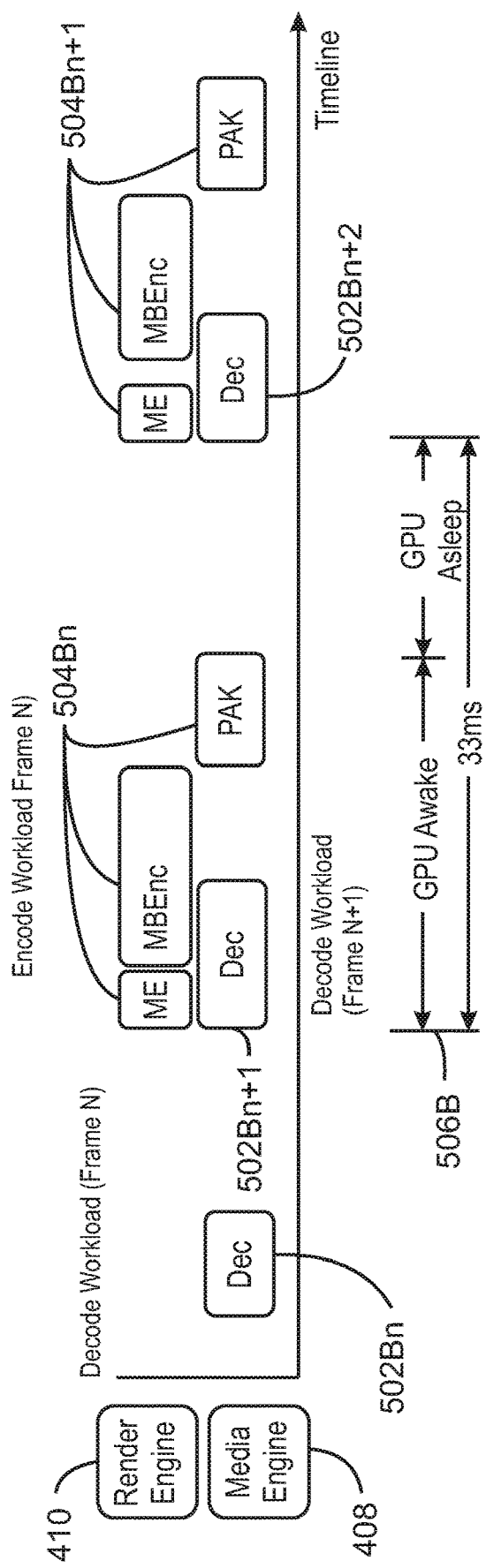
FIG. 5B is a timeline of encoding and decoding video in parallel.

FIG. 5B is a timeline 500B of serial encoding and decoding of video frames by embodiments of the claimed subject matter. Similar to the timeline 500A, the timeline 500B shows the timing of the execution of the individual subtasks for encoding and decoding video as performed by the media engine 408 and render engine 410. As shown, media engine 408 initially performs a decoding workload for for frame n, as shown at block 502Bn. Subsequently, the render engine 410 performs an encode workload for video frame n. Additionally, at the same time the render engine 410 is encoding video frame n, the media engine 408 performs the decode workload for video frame n+1, as shown at block 502Bn+1. When the macroblock encoding for frame n is complete, the media engine 408 performs the packaging subtask for frame n. At the end of the GPU cycle, the encoding and decoding workloads may be performed for video frames n+1 and n+2, as shown at blocks 504Bn+1 and 502Bn+2, respectively. In this way, the amount of time there is no activity in the media engine 408 and render engine 410 while the GPU is awake is reduced, thus improving the efficiency of the use of the GPU 414.

Figure 6:
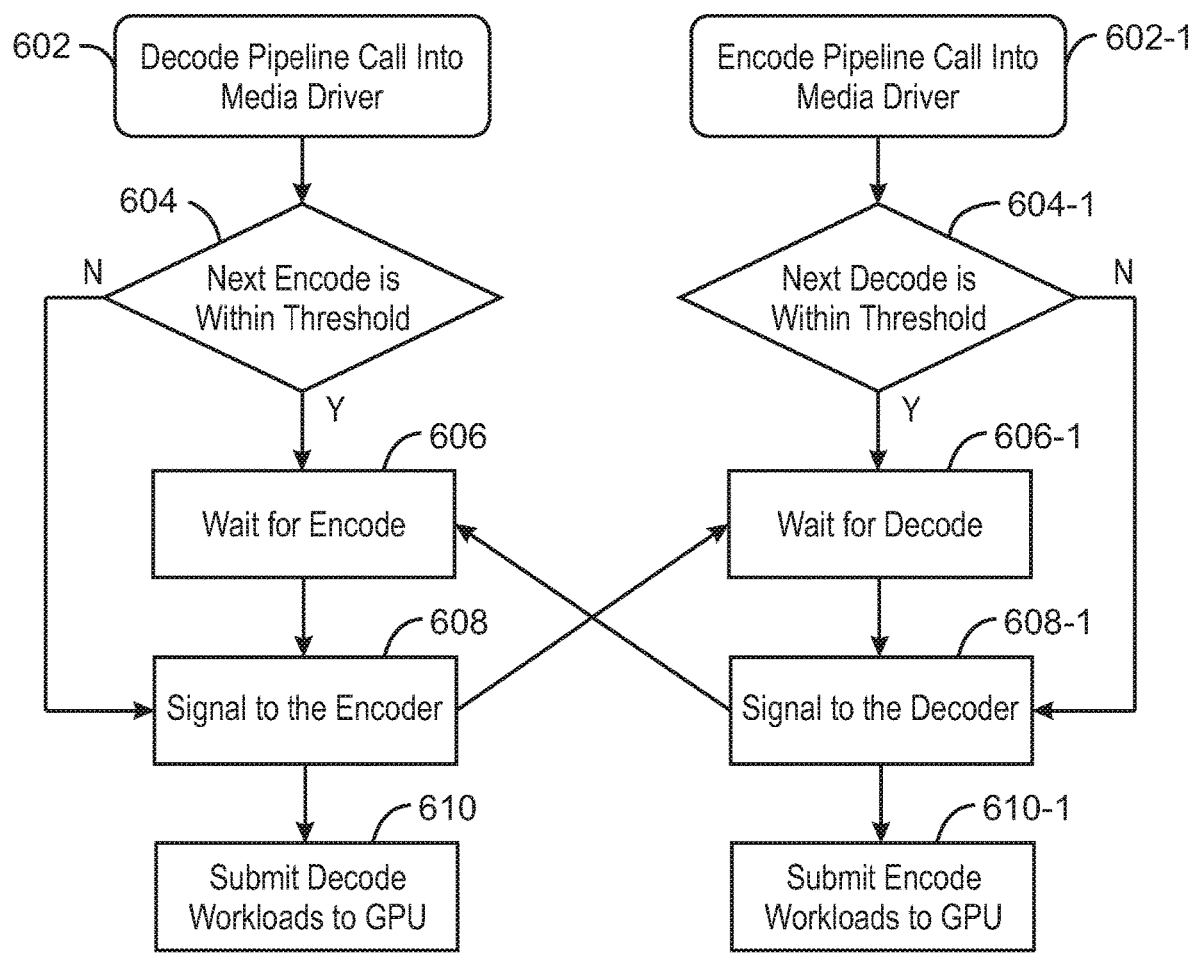
FIG. 6 is a process flow diagram of a method for encoding and decoding.

FIG. 6 is a process flow diagram of a method 600 for encoding and decoding video using the mobile device 102. The method 600 is performed by the media driver 214, described with respect to FIG. 2, and begins at block 602, where a decode pipeline call is made into the media driver 214. The decode pipeline call is made as part of the decode process 304, described with respect to FIG. 3. Referring back to FIG. 6, at block 604, the media driver 214 determines whether the next encoding is within a specified threshold. Determining whether the next encoding is within the specified threshold is a determination as to whether the re-encoding process 308 is available to re-encode the current video frame. If the next encoding is within the threshold, at block 606, the media driver 214 waits for the re-encoding process 308 to start. Once the re-encoding starts, which usually means the encode pipeline executes to 608-1 to signal decode and 610-1 to encode, decode pipeline ends wait for encode 606 and flows to block 608 which sends a signal to encode pipeline (will not be used in this case as encode pipeline is not waiting). Decode pipeline then flows to block 610 to start decode. At this point, the encode and decode almost starts submitting workloads to GPU at the same time, so it can ensure the concurrency between Media Engine 408 and Render Engine 410. If the next encoding is not within the threshold, the decode pipeline 602 will send a signal 608 to encode pipeline 602-1 then starts decode. The encode pipeline 602-1 receives the signal and ends wait for decode 606-1. It drops a signal to decode pipeline (not used as decode pipeline is not waiting) then starts encode. The decode and encode starts submitting workloads to GPU at the same time, so it can also ensure the concurrency between Media Engine 408 and Render Engine 410.

At block 602-1, an encode pipeline call is made into the media driver 214. The encode pipeline call is made as part of the re-encoding process 308. At block 604-1, the media driver 214 determines whether the next decode is within a specified threshold. Determining whether the next decoding is within the specified threshold is a determination as to whether the decoding process 308 is available to decode the next video frame. If the next encoding is within the threshold, at block 606-1, the media driver 214 waits for the decoding process 308 to start. Once the decoding starts, which usually means the decode pipeline executes block 608 to signal encode and block 610 to submit decode workload to GPU, encode pipeline control flows to block 608-1, where the media driver 214 signals to the decoding process 304 (not used as decode pipeline is not wait) then submits encode workloads to GPU. The decode and encode starts submitting workloads to GPU at the same time, so it can ensure the concurrency between Media Engine 408 and Render Engine 410. If the next decoding is not within the threshold, the encode pipeline goes to 608-1 to signal decode pipeline and 610-1 to submit encode workloads to GPU. Decode pipeline receives signal and ends wait for encode 606. It goes to 608 to send a signal to encode pipeline (not used as encode pipeline is not waiting) and 610 to submit decode workload to GPU. So it can also ensure the concurrency between Media Engine 408 and Render Engine 410.

FIG. 7 is a table 700 showing the advantage of adaptive scheduling of encoding and decoding over default, or current systems. Concurrency, as described above, is the amount of concurrent execution of the media engine 408 and render engine 410. As shown, concurrency percentage of 1.504%, under default systems is relatively low in comparison to the concurrency of 30.697% of adaptive systems. GPU utilization percentage represents the percentage of time that the GPU 414 is executing one of the media engine 408, render engine 410, and packaging components 412. As shown, the GPU utilization of 30.444% under default systems is reduced to 23.784% under adaptive systems, providing power savings. Accordingly, the GPU power usage under default systems of 208 mW, is reduced to 198 mW under adaptive systems. In other words, the adaptive scheduling of the claimed subject matter show improvements over current systems in all three categories of use.

Figure 8:
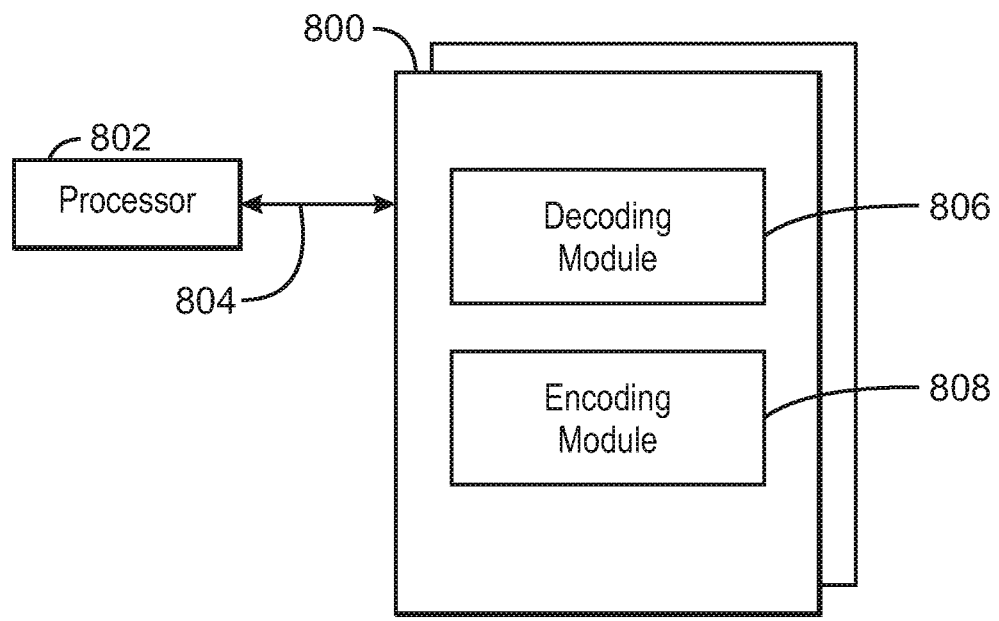
FIG. 8 is a block diagram showing computer readable media that stores code for encoding and decoding video.

FIG. 8 is a block diagram showing computer readable media 800 that store code for interfacing with a computing device. The computer readable media 800 may be accessed by a processor 802 over a computer bus 804. Furthermore, the computer readable medium 800 may include code configured to direct the processor 802 to perform the methods described herein. In some embodiments, the computer readable media 800 may be non-transitory computer readable media. In some examples, the computer readable media 800 may be storage media. However, in any case, the computer readable media do not include transitory media such as carrier waves, signals, and the like.

The various software components discussed herein can be stored on one or more computer readable media 800, as indicated in FIG. 8. For example, a decoding module 806 can be configured to perform the present techniques described herein. The decoding module 806 performs decoding of a video frame, n+1, in parallel with the re-encoding of a video frame, n. The parallel re-encoding of video frame, n, is performed by an encoding module 808.

The block diagram of FIG. 8 is not intended to indicate that the computer readable media 800 is to include all of the components shown in FIG. 8. Further, the computer readable media 800 can include any number of additional components not shown in FIG. 8, depending on the details of the specific implementation.

EXAMPLES

Example 1 is an apparatus for encoding and decoding video. The apparatus includes means to: receive a request to decode a current video frame; determine whether encoding is within a threshold for a previous video frame; wait for the encoding to complete if the encoding is within the threshold; provide a signal to begin encoding the current video frame; submit a decode workload to a graphics processor unit (GPU) for the current video frame; and submit, in parallel with submitting the decode workload to the GPU, an encode workload to the GPU for the previous video frame.

Example 2 includes the apparatus of example 1, including or excluding optional features. In this example, the apparatus includes means to: receive a request to encode the current video frame; determine whether decoding is within a threshold for a next video frame; wait for the decoding to complete if the decoding is within the threshold; provide a signal to begin decoding the next video frame; submit a next decode workload to the GPU for the next video frame; and submit, in parallel with submitting the next decode workload to the GPU, a next encode workload to the GPU for the current video frame.

Example 3 includes the apparatus of any one of examples 1 to 2, including or excluding optional features. In this example, the decode workload comprises: a subtask to decode an encoded video frame; and a subtask to package the decoded video frame.

Example 4 includes the apparatus of any one of examples 1 to 3, including or excluding optional features. In this example, the encode workload comprises: a subtask to decode perform motion estimation for the decoded video frame; and a subtask to perform motion block encoding for the decoded video frame.

Example 5 includes the apparatus of any one of examples 1 to 4, including or excluding optional features. In this example, the GPU comprises a media engine and a render engine. Optionally, the media engine performs the decode workload for the current video frame in parallel with the render engine performing the encode workload for the previous video frame. Optionally, the media engine performs the decode workload for the next video frame in parallel with the render engine performing the encode workload for the current video frame.

Example 6 includes the apparatus of any one of examples 1 to 5, wherein the media engine performs the decode workload for the current video frame in parallel with the render engine performing the encode workload for the previous video frame.

Example 7 includes the apparatus of any one of examples 1 to 5, wherein the media engine performs the decode workload for the next video frame in parallel with the render engine performing the encode workload for the current video frame.

Example 8 includes the apparatus of any one of examples 1 to 5, including or excluding optional features. In this example, the encode workload is encoded to a protocol for wireless transmission to a wireless display adapter.

Example 9 includes the apparatus of example 8, including or excluding optional features. In this example, the encode workload is encoded to a protocol for wireless transmission to a wireless display device. Optionally, example 9 includes means to transmit the encoded workload to the wireless display adapter.

Example 10 is a method for encoding and decoding video. The method includes receiving a request to decode a current video frame; determining whether encoding is within a threshold for a previous video frame; waiting for the encoding to complete if the encoding is within the threshold; providing a signal to begin encoding the current video frame; submitting a decode workload to a graphics processor unit (GPU) for the current video frame; and submitting, in parallel with submitting the decode workload to the GPU, an encode workload to the GPU for the previous video frame.

Example 11 includes the method of example 10, including or excluding optional features. In this example, the method includes receiving a request to encode the current video frame; determining whether decoding is within a threshold for a next video frame; waiting for the decoding to start if the decoding is within the threshold; providing a signal to begin decoding the next video frame; submitting a next decode workload to the GPU for the next video frame; and submitting, in parallel with submitting the next decode workload to the GPU, a next encode workload to the GPU for the current video frame.

Example 12 includes the method of any one of examples 10 to 11, including or excluding optional features. In this example, the decode workload comprises: a subtask to decode an encoded video frame; and a subtask to package the decoded video frame.

Example 13 includes the method of any one of examples 10 to 12, including or excluding optional features. In this example, the encode workload comprises: a subtask to decode perform motion estimation for the decoded video frame; and a subtask to perform motion block encoding for the decoded video frame.

Example 14 includes the method of any one of examples 10 to 13, including or excluding optional features. In this example, the GPU comprises a media engine and a render engine.

Example 15 includes the method of example 14. Optionally, the media engine performs the decode workload for the current video frame in parallel with the render engine performing the encode workload for the previous video frame.

Example 16 includes the method of example 14. Optionally, the media engine performs the decode workload for the next video frame in parallel with the render engine performing the encode workload for the current video frame.

Example 17 includes the method of example 14. Optionally, the method includes transmitting the encoded workload to the wireless display adapter, wherein the encoded workload is encoded to a protocol for wireless transmission to a wireless display adapter.

Example 18 is a non-transitory machine-readable medium comprising instructions that, when executed by a processor, direct the processor to receive a request to decode a current video frame; determine whether encoding is within a threshold for a previous video frame; wait for the encoding to complete if the encoding is within the threshold; provide a signal to begin encoding the current video frame; submit a decode workload to a graphics processor unit (GPU) for the current video frame; and submit, in parallel with submitting the decode workload to the GPU, an encode workload to the GPU for the previous video frame.

Example 19 includes the non-transitory machine-readable medium of example 18, including or excluding optional features. In this example, the medium comprises instructions that, when executed by a processor, direct the processor to receive a request to encode the current video frame; determine whether decoding is within a threshold for a next video frame; wait for the decoding to start if the decoding is within the threshold; provide a signal to begin decoding the next video frame; submit a next decode workload to the GPU for the next video frame; and submit, in parallel with submitting the next decode workload to the GPU, a next encode workload to the GPU for the current video frame.

Example 20 includes the non-transitory machine-readable medium of example 18, including or excluding optional features. In this example, the decode workload comprises: a subtask to decode an encoded video frame; and a subtask to package the decoded video frame.

Example 21 includes the non-transitory machine-readable medium of example 18, including or excluding optional features. In this example, the encode workload comprises: a subtask to decode perform motion estimation for the decoded video frame; and a subtask to perform motion block encoding for the decoded video frame.

Example 22 includes the non-transitory machine-readable medium of example 18, including or excluding optional features. In this example, the GPU comprises a media engine and a render engine.

Example 23 includes the non-transitory machine-readable medium of example 18, including or excluding optional features. Optionally, the media engine performs the decode workload for the current video frame in parallel with the render engine performing the encode workload for the previous video frame.

Example 24 includes the non-transitory machine-readable medium of example 18, including or excluding optional features. Optionally, the media engine performs the decode workload for the next video frame in parallel with the render engine performing the encode workload for the current video frame.

Example 25 includes the non-transitory machine-readable medium of example 18, including or excluding optional features. Optionally, the method includes transmitting the encoded workload to the wireless display adapter, wherein the encoded workload is encoded to a protocol for wireless transmission to a wireless display adapter.

Example 26 is an apparatus that includes means to perform a method that includes: receiving a request to decode a current video frame; determining whether encoding is within a threshold for a previous video frame; waiting for the encoding to complete if the encoding is within the threshold; providing a signal to begin encoding the current video frame; submitting a decode workload to a graphics processor unit (GPU) for the current video frame; and submitting, in parallel with submitting the decode workload to the GPU, an encode workload to the GPU for the previous video frame.

Example 27 includes the apparatus of example 26, including or excluding optional features. In this example, the method includes: receiving a request to encode the current video frame; determining whether decoding is within a threshold for a next video frame; waiting for the decoding to start if the decoding is within the threshold; providing a signal to begin decoding the next video frame; submitting a next decode workload to the GPU for the next video frame; and submitting, in parallel with submitting the next decode workload to the GPU, a next encode workload to the GPU for the current video frame.

Example 28 includes the apparatus of example 26, including or excluding optional features. In this example, the decode workload comprises: a subtask to decode an encoded video frame; and a subtask to package the decoded video frame.

Example 29 includes the apparatus of example 26, including or excluding optional features. In this example, the encode workload comprises: a subtask to decode perform motion estimation for the decoded video frame; and a subtask to perform motion block encoding for the decoded video frame.

Example 30 includes the apparatus of example 26, including or excluding optional features. In this example, the GPU comprises a media engine and a render engine.

Example 31 includes the apparatus of example 26, including or excluding optional features. In this example, the media engine performs the decode workload for the current video frame in parallel with the render engine performing the encode workload for the previous video frame.

Example 32 includes the apparatus of example 26, including or excluding optional features. In this example, the media engine performs the decode workload for the next video frame in parallel with the render engine performing the encode workload for the current video frame.

Example 33 includes the apparatus of example 26, including or excluding optional features. In this example, the method includes transmitting the encoded workload to the wireless display device, wherein the encoded workload is encoded to a protocol for wireless transmission to a wireless display device.

Example 34 is a non-transitory machine-readable medium comprising instructions that, when executed by a processor, direct the processor to: receive a request to decode a current video frame; determine whether encoding is within a threshold for a previous video frame; wait for the encoding to start if the encoding is within the threshold; provide a signal to begin encoding the current video frame; submit a decode workload to a graphics processor unit (GPU) for the current video frame; and submit, in parallel with submitting the decode workload to the GPU, an encode workload to the GPU for the previous video frame.

Example 35 includes the computer-readable medium of example 34, including or excluding optional features. In this example, the computer-readable medium includes instructions that, when executed by the processor, direct the processor to: receive a request to encode the current video frame; determine whether decoding is within a threshold for a next video frame; wait for the decoding to start if the decoding is within the threshold; provide a signal to begin decoding the next video frame; submit a next decode workload to the GPU for the next video frame; and submit, in parallel with submitting the next decode workload to the GPU, a next encode workload to the GPU for the current video frame.

Example 36 includes the computer-readable medium of any one of examples 34 to 35, including or excluding optional features. In this example, the decode workload comprises: a subtask to decode an encoded video frame; and a subtask to package the decoded video frame.

Example 37 includes the computer-readable medium of any one of examples 34 to 36, including or excluding optional features. In this example, the encode workload comprises: a subtask to decode perform motion estimation for the decoded video frame; and a subtask to perform motion block encoding for the decoded video frame.

Example 38 includes the computer-readable medium of any one of examples 34 to 37, including or excluding optional features. In this example, the GPU comprises a media engine and a render engine.

Example 39 includes the computer-readable medium of example 38, including or excluding optional features. Optionally, the media engine performs the decode workload for the current video frame in parallel with the render engine performing the encode workload for the previous video frame.

Example 40 includes the computer-readable medium of example 38, including or excluding optional features. Optionally, the media engine performs the decode workload for the next video frame in parallel with the render engine performing the encode workload for the current video frame.

Example 41 includes the computer-readable medium of example 38, including or excluding optional features. Optionally, the encoded workload is encoded to a protocol for wireless transmission to a wireless display adapter.

Example 42 is an apparatus. The apparatus includes a processor; a graphics processor unit (GPU); and a system memory comprising machine-readable instructions that cause the processor to: receive a request to decode a current video frame; determine whether encoding is within a threshold for a previous video frame; wait for the encoding to complete if the encoding is within the threshold; provide a signal to begin encoding the current video frame; submit a decode workload to the GPU for the current video frame; and submit, in parallel with submitting the decode workload to the GPU, an encode workload to the GPU for the previous video frame.

Example 43 includes the apparatus of example 42, including or excluding optional features. In this example, the apparatus includes machine-readable instructions to: receive a request to encode the current video frame; determine whether decoding is within a threshold for a next video frame; wait for the decoding to complete if the decoding is within the threshold; provide a signal to begin decoding the next video frame; submit a next decode workload to the GPU for the next video frame; and submit, in parallel with submitting the next decode workload to the GPU, a next encode workload to the GPU for the current video frame.

Example 44 includes the apparatus of any one of examples 42 to 43, including or excluding optional features. In this example, the decode workload comprises: a subtask to decode an encoded video frame; and a subtask to package the decoded video frame.

Example 45 includes the apparatus of any one of examples 42 to 44, including or excluding optional features. In this example, the encode workload comprises: a subtask to decode perform motion estimation for the decoded video frame; and a subtask to perform motion block encoding for the decoded video frame.

Example 46 includes the apparatus of any one of examples 42 to 45, including or excluding optional features. In this example, the GPU comprises a media engine and a render engine. Optionally, the media engine performs the decode workload for the current video frame in parallel with the render engine performing the encode workload for the previous video frame. Optionally, the media engine performs the decode workload for the next video frame in parallel with the render engine performing the encode workload for the current video frame.

Example 47 includes the apparatus of any one of examples 42 to 45, including or excluding optional features. In this example, the encode workload is encoded to a protocol for wireless transmission to a wireless display adapter. Optionally, the apparatus includes machine-readable instructions to transmit the encoded workload to the wireless display adapter.

Example 48 is an apparatus that includes a processor and a system memory that includes machine-readable instructions that cause the processor to decode an encoded workload for presentation on a wireless display device, wherein the encoded workload is generated by: receiving a request to decode a current video frame; determining whether encoding is within a threshold for a previous video frame; waiting for the encoding to complete if the encoding is within the threshold; providing a signal to begin encoding the current video frame; submitting a decode workload to a graphics processor unit (GPU) for the current video frame; and submitting, in parallel with submitting the decode workload to the GPU, an encode workload to the GPU for the previous video frame.

Example 49 includes the apparatus of example 48, including or excluding optional features. In this example, the encoded workload is generated by: receiving a request to encode the current video frame; determining whether decoding is within a threshold for a next video frame; waiting for the decoding to complete if the decoding is within the threshold; providing a signal to begin decoding the next video frame; submitting a next decode workload to the GPU for the next video frame; and submitting, in parallel with submitting the next decode workload to the GPU, a next encode workload to the GPU for the current video frame.

Example 50 includes the apparatus of any one of examples 48 to 49, including or excluding optional features. In this example, the decode workload comprises: a subtask to decode an encoded video frame; and a subtask to package the decoded video frame.

Example 51 includes the apparatus of any one of examples 48 to 50, including or excluding optional features. In this example, the encode workload comprises: a subtask to decode perform motion estimation for the decoded video frame; and a subtask to perform motion block encoding for the decoded video frame.

Example 52 includes the apparatus of any one of examples 48 to 50, including or excluding optional features. In this example, the GPU comprises a media engine and a render engine. Optionally, the media engine performs the decode workload for the current video frame in parallel with the render engine performing the encode workload for the previous video frame. Optionally, the media engine performs the decode workload for the next video frame in parallel with the render engine performing the encode workload for the current video frame.

Example 53 includes the apparatus of example 52, including or excluding optional features. In this example, the encode workload is encoded to a protocol for wireless transmission to a wireless display adapter. Optionally, the apparatus includes machine-readable instructions to transmit the encoded workload to the wireless display adapter.

Example 54 is an apparatus. The apparatus includes a display; and a wireless display adapter that decodes an encoded workload for presentation on the display, wherein the encoded workload is generated by: receiving a request to decode a current video frame; determining whether encoding is within a threshold for a previous video frame; waiting for the encoding to complete if the encoding is within the threshold; providing a signal to begin encoding the current video frame; submitting a decode workload to a graphics processor unit (GPU) for the current video frame; and submitting, in parallel with submitting the decode workload to the GPU, an encode workload to the GPU for the previous video frame.

Example 55 includes the apparatus of example 54, including or excluding optional features. In this example, the encoded workload is generated by: receiving a request to encode the current video frame; determining whether decoding is within a threshold for a next video frame; waiting for the decoding to complete if the decoding is within the threshold; providing a signal to begin decoding the next video frame; submitting a next decode workload to the GPU for the next video frame; and submitting, in parallel with submitting the next decode workload to the GPU, a next encode workload to the GPU for the current video frame.

Example 56 includes the apparatus of any one of examples 54 to 55, including or excluding optional features. In this example, the decode workload comprises: a subtask to decode an encoded video frame; and a subtask to package the decoded video frame.

Example 57 includes the apparatus of any one of examples 54 to 56, including or excluding optional features. In this example, the encode workload comprises: a subtask to decode perform motion estimation for the decoded video frame; and a subtask to perform motion block encoding for the decoded video frame.

Example 58 includes the apparatus of any one of examples 54 to 57, including or excluding optional features. In this example, the GPU comprises a media engine and a render engine. Optionally, the media engine performs the decode workload for the current video frame in parallel with the render engine performing the encode workload for the previous video frame. Optionally, the media engine performs the decode workload for the next video frame in parallel with the render engine performing the encode workload for the current video frame. Example 59 includes the apparatus of example 58, including or excluding optional features. In this example, the encode workload is encoded to a protocol for wireless transmission to a wireless display adapter. Optionally, the apparatus includes machine-readable instructions to transmit the encoded workload to the wireless display adapter.

Not all components, features, structures, characteristics, etc., described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus comprising:
a graphics processor unit (GPU); and
a processor to:
access a request to decode a current video frame of a video;
determine whether an encoding process is available;
wait for the encoding process to complete if the encoding process is not available;
submit a decode workload for the current video frame to the GPU; and
submit an encode workload for a previous video frame of the video to the GPU at a time to cause the GPU to execute the decode workload for the current video frame and the encode workload for the previous video frame in parallel.

2. The apparatus of claim 1, wherein the processor is to:
access a request to encode the current video frame;
determine whether a decoding process is available;
wait for the decoding process to complete if the decoding process is not available;
submit a next decode workload for a next video frame of the video to the GPU; and
submit a next encode workload for the current video frame to the GPU at a second time to cause the GPU to execute the next decode workload for the next video frame and the next encode workload for the current video frame in parallel.

3. The apparatus of claim 1, wherein the decode workload includes:
a subtask to decode an encoded video frame.

4. The apparatus of claim 1, wherein the encode workload includes:
a subtask to perform motion estimation for a decoded video frame; and
a subtask to perform motion block encoding for the decoded video frame.

5. The apparatus of claim 2, wherein the GPU includes a media engine and a render engine.

6. The apparatus of claim 5, wherein the media engine performs the decode workload for the current video frame in parallel with the render engine performing the encode workload for the previous video frame.

7. The apparatus of claim 5, wherein the media engine performs the next decode workload for the next video frame in parallel with the render engine performing the next encode workload for the current video frame.

8. The apparatus of claim 1, wherein the encode workload is based on a protocol for wireless transmission to a wireless display adapter.

9. The apparatus of claim 8, wherein the processor is to transmit an output of the encode workload to the wireless display adapter.

10. A method for encoding and decoding video, the method comprising:
receiving a request to decode a current video frame of a video;
determining whether an encoding process is available;
waiting for the encoding process to complete if the encoding process is not available;
submitting a decode workload for the current video frame to a graphics processor unit (GPU); and
submitting an encode workload for a previous video frame of the video to the GPU at a time to cause the GPU to execute the decode workload for the current video frame and the encode workload for the previous video frame in parallel.

11. The method of claim 10, further including:
receiving a request to encode the current video frame;
determining whether a decoding process is available;
waiting for the decoding process to start if the decoding process is not available;
submitting a next decode workload for a next video frame of the video to the GPU; and
submitting a next encode workload for the current video frame to the GPU at a second time to cause the GPU to execute the next decode workload for the next video frame and the next encode workload for the current video frame in parallel.

12. The method of claim 10, wherein the decode workload includes:
a subtask to decode an encoded video frame.

13. The method of claim 10, wherein the encode workload includes:
a subtask to perform motion estimation for a decoded video frame; and
a subtask to perform motion block encoding for the decoded video frame.

14. The method of claim 11, wherein the GPU includes a media engine and a render engine.

15. The method of claim 14, wherein the media engine performs the decode workload for the current video frame in parallel with the render engine performing the encode workload for the previous video frame.

16. The method of claim 14, wherein the media engine performs the next decode workload for the next video frame in parallel with the render engine performing the next encode workload for the current video frame.

17. The method of claim 10, further including transmitting an output of the encode workload to a wireless display device, wherein the encode workload is based on a protocol for wireless transmission to the wireless display device.

18. A non-transitory machine-readable medium comprising instructions that, when executed, cause a processor to at least:
access a request to decode a current video frame of a video;
determine whether an encoding process is available;
wait for the encoding process to complete if the encoding process is not available;
submit a decode workload for the current video frame to a graphics processor unit (GPU); and
submit an encode workload to the GPU for a previous video frame of the video to the GPU at a time to cause the GPU to execute the decode workload for the current video frame and the encode workload for the previous video frame in parallel.

19. The machine-readable medium of claim 18, wherein the instructions cause the processor to:
access a request to encode the current video frame;
determine whether a decoding process is available;
wait for the decoding process to complete if the decoding process is not available;
submit a next decode workload for a next video frame of the video to the GPU; and
submit a next encode workload to the GPU for the current video frame to the GPU at a second time to cause the GPU to execute the next decode workload for the next video frame and the next encode workload for the current video frame in parallel.

20. The machine-readable medium of claim 18, wherein the decode workload includes a subtask to decode an encoded video frame, and wherein the encode workload includes:
a subtask to perform motion estimation for a decoded video frame; and
a subtask to perform motion block encoding for the decoded video frame.

* * * * *

UNITED STATES PATENT AND TRADEMARK OFFICE
CERTIFICATE OF CORRECTION

PATENT NO. : 11,968,380 B2  
APPLICATION NO. : 16/305462  
DATED : April 23, 2024  
INVENTOR(S) : Wu et al.

Page 1 of 1

It is certified that error appears in the above-identified patent and that said Letters Patent is hereby corrected as shown below:

In the Claims

Column 18, Line 21 (Claim 18), replace "workload to the GPU for" with --workload for--

Column 18, Line 34 (Claim 19), replace "workload to the GPU for" with --workload for--

Signed and Sealed this  
Twenty-third Day of July, 2024

Katherine Kelly Vidal  
*Director of the United States Patent and Trademark Office*